United States Patent [19]
Lauck

[11] 3,934,049
[45] Jan. 20, 1976

[54] GELLING AGENT FOR COLD SET PUDDING COMPOSITIONS

[75] Inventor: Robert M. Lauck, New City, N.Y.

[73] Assignee: Stauffer Chemical Company, Westport, Conn.

[22] Filed: May 13, 1974

[21] Appl. No.: 469,156

[52] U.S. Cl................................. 426/573; 426/579
[51] Int. Cl.²........................................ A23L 1/187
[58] Field of Search ........... 426/167, 573, 575, 579, 426/350

[56] References Cited
UNITED STATES PATENTS

| | | | |
|---|---|---|---|
| 2,484,543 | 10/1949 | Baldwin et al. | 426/167 |
| 2,554,143 | 5/1951 | Hinz et al. | 426/167 |
| 2,607,692 | 8/1952 | Kennedy et al. | 426/167 |
| 2,801,924 | 8/1957 | Clausi | 426/167 |
| 2,829,978 | 4/1958 | Castagna et al. | 426/167 |
| 2,901,355 | 8/1959 | Bangert et al. | 426/167 |
| 2,927,861 | 3/1960 | Charie et al. | 426/167 |
| 3,770,462 | 11/1973 | Schuppner | 426/329 |

Primary Examiner—Jeanette M. Hunter

[57] ABSTRACT

An improved gelling agent composition comprising in combination an alkali metal pyrophosphate, an alkaline earth metal orthophosphate, an alkali metal carbonate, and a thickening agent, the combination being useful in preparing cold set milk puddings. Preferably, the improved gelling agent combination comprises tetrasodium pyrophosphate or sodium acid pyrophosphate, monocalcium phosphate, sodium carbonate, and pregelatinized starch. The improved gelling agent is added to milk, or water containing redissolved nonfat dry milk, or redissolved casein.

22 Claims, No Drawings

GELLING AGENT FOR COLD SET PUDDING COMPOSITIONS

BACKGROUND OF THE INVENTION

Generally, the present invention relates to an improved gelling agent combination useful in preparing cold set milk puddings. More particularly, the invention relates to an improved gelling agent combination comprising an alkali metal pyrophosphate, an alkaline earth metal orthophosphate, an alkali metal carbonate, and a thickening agent.

Cold set milk puddings and their gelling agents are known. Generally, cold set milk pudding compositions comprise a gelling agent, precooked starch, and milk.

Various gelling agent combinations have been used to prepare cold set milk puddings. U.S. Pat. No. 2,607,692 teaches the use of a gelling agent combination comprising a tetraalkali metal pyrophosphate, such as tetrasodium pyrophosphate or tetrapotassium pyrophosphate, and an edible water-soluble calcium salt, for instance calcium acetate, calcium chloride, calcium propionate, calcium saccharate and calcium tartrate for use in preparing cold set milk puddings. However, cold set milk pudding prepared with the gelling agent composition taught in U.S. Pat. No. 2,607,692 are known to exhibit an undesirable final viscosity in that they become rubbery or tough upon standing and therefore must be consumed shortly after preparation.

Another gelling agent combination for preparing cold set milk puddings is taught by U.S. Pat. No. 2,801,924. This gelling agent combination comprises an alkali metal pyrophosphate, as for example, monosodium trihydrogen pyrophosphate, disodium dihydrogen pyrophosphate, trisodium monohydrogen pyrophosphate, and tetrasodium pyrophosphate, and an alkali metal orthophosphate, such as mono-, di-, and trialkali orthophosphates. However, cold set milk puddings prepared with the gelling agent combination taught in U.S. Pat. No. 2,801,924 have been known to exhibit an undesirable initial viscosity in that they initially exhibit a texture which is thin or watery.

It is further known that U.S. Pat. No. 2,927,861 teaches the use of a gelling agent combination comprising a pregelatinized starch, a tetraalkali metal pyrophosphate, and a water-soluble alkaline reacting substance, such as alkali metal carbonates and bicarbonates, in the preparation of cold set milk puddings. However, one major problem associated with cold set milk puddings prepared with the gelling agent combination of U.S. Pat. No. 2,927,861 is the sensitivity of the cold set milk pudding to the particular grade of tetraalkali metal pyrophosphate used in the gelling agent combination. This results in cold set milk puddings exhibiting variable quality depending on the type of pyrophosphate being used.

In contrast, cold set milk puddings having the problems previously mentioned relating to initial and final viscosity, texture, and variable quality are overcome by the novel gelling agent composition of the present invention.

BRIEF SUMMARY OF THE INVENTION

In accordance with the present invention, there is provided an improved gelling agent for use in preparing a cold set milk pudding comprising the combination of an alkali metal pyrophosphate, an alkaline earth metal orthophosphate, an alkali metal carbonate, and a thickening agent selected from the group consisting of pregelatinized starch, gums, or mixtures thereof.

The gelling agent combination of the present invention when mixed with milk or a water solution of milk protein is useful in providing cold set milk puddings exhibiting improved initial and final pudding viscosity, texture, and taste.

DETAILED DESCRIPTION OF THE INVENTION

By alkali metal pyrophosphate it is meant to denote all water soluble alkali metal pyrophosphates and is intended to include dialkali metal pyrophosphates and/or tetraalkali metal pyrophosphates. Preferably, by alkali metal is meant sodium or potassium. Since the pudding is intended for human consumption the alkali metal pyrophosphate should be of the grade suitable for human food use, i.e., food grade. Preferably, by tetraalkali metal pyrophosphate it is meant tetrasodium or tetrapotassium pyrophosphate and by dialkali metal pyrophosphate it is meant disodium dihydrogen or dipotassium dihydrogen pyrophosphate. The alkali metal pyrophosphate of the present invention can be used in the gelling agent combination at a concentration ranging from about 0.25 to about 0.6 percent, preferably from about 0.3 to about 0.5 percent, and more preferably from about 0.29 to about 0.43 percent by weight of the final pudding.

By alkaline earth metal orthophosphate it is meant to denote water soluble food grade alkaline earth metal orthophosphates. Preferably by alkaline earth metal it is meant alkaline earth metals such as calcium, magnesium, or mixtures thereof. Most preferably, by alkaline earth metal orthophosphate it is meant monocalcium dihydrogen phosphate, i.e., monocalcium phosphate. The alkaline earth metal orthophosphate of the present invention can be used in the gelling agent combination at a concentration ranging from about 0.03 to about 0.2 percent by weight of the final pudding. Preferably, the monocalcium dihydrogen phosphate of the present invention is present in the gelling agent combination at a concentration ranging from about 0.09 to about 0.14 percent by weight of the final pudding.

By alkali metal carbonate it is meant to denote any water soluble, food grade alkali metal carbonate. More specifically, by alkali metal carbonate it is meant sodium or potassium carbonate, or sodium or potassium bicarbonate. The alkali metal carbonate of the present invention can be used in the gelling agent combination at a concentration ranging from about 0.0015 to about 0.3 percent by weight of the final pudding. Preferably, the alkali metal carbonate of the present invention is used at a concentration ranging from about 0.1 to about 0.3 percent by weight of the final pudding.

By thickening agent it is meant to denote thickening agents as for example pregelatinized starch, either grain or root based, such as corn, sorghum, wheat, potato, tapioca, sago, and the like, gums, such as acacia, agar agar, alginates, carob bean gum, carrageenin, ghatti gum, guar gum, sterculia gum, tragacanth, and the like, and synthetic gums such as carboxymethyl cellulose, carboxyethyl cellulose, and the like. The thickening agent of the present invention can be used in the gelling agent combination at a concentration ranging from about 0.15 to about 4.5 percent by weight of the final pudding. Preferably, the thickening agent is pregelatinized starch. Most preferably, the pregelatinized starch of the present invention is used in the gelling agent combination at a concentration ranging from about 3.1 to about 3.4 percent by weight of the final puddings.

Also, the gelling agent combination can include a sweetening and/or dispersing agent, as for example, a sugar. Preferably, the sweetening and/or dispersing agent includes sucrose, such as Baker's Special sugar, powdered sugar, dextrose, lactose, sorbitol, mannitol, and the like. Most preferably, the sweetening and/or dispersing agent is sucrose (Baker's Special sugar). The sweetening agent and/or dispersing agent can be used in the pudding composition, of the present invention at any desired concentration to suit particular taste requirements.

In addition, the gelling agent of the present invention can include optional flavoring agents, as for example vanilla, strawberry, cocoa and the like. The flavoring agents can be used in the pudding composition at any desired concentration depending upon the particular flavoring desired.

Further, optional ingredients can be added to the gelling agent combination, as for example, salt without affecting the gelling properties of the gelling agent.

The gelling agent combination of the present invention is added to a water solution of milk protein. The water solution of milk protein includes for example whole fluid milk, partially skimmed milk, skimmed milk, reconstituted nonfat dry milk, reconstituted casein, and the like. The gelling agent of the present invention can be added to the water solution containing milk protein at a concentration ranging from about 0.43 to about 5.6 percent by weight of the final pudding. Preferably, the gelling agent combination is added to the water solution containing milk protein at a concentration ranging from about 3.6 to about 4.3 percent by weight of the final pudding.

Alternatively, the gelling agent combination of the present invention can be admixed with nonfat dry milk, dry whole milk, dry casein, and the like to provide a dry mix capable of being reconstituted with water at a desirable time to provide a cold set milk pudding. The gelling agent combination is admixed with the dry material containing milk protein at a concentration equivalent to that specified for the aqueous solution described above.

The process of preparing a cold set milk pudding in accordance with the present invention comprises separately dry blending the dry ingredients of a gelling agent combination comprising an alkali metal pyrophosphate, an alkaline earth metal orthophosphate, an alkali metal carbonate, and a thickening agent with an aqueous solution of milk protein to provide a milk pudding dispersion having between about 0.4 to 5.4 percent of the dry ingredients, the percent based on the weight of the dispersion, cooling the milk pudding dispersion to between about 0°C. and 21°C. for at least 5 minutes to provide a cold set milk pudding.

More particularly, the process of preparing a cold set milk pudding in accordance with the present invention comprises separately dry blending the dry ingredients of a gelling agent combination comprising from about 0.25 to 0.6 percent of an alkali metal pyrophosphate, from about 0.03 to 0.2 percent of an alkaline earth metal orthophosphate, from about 0.0015 to 0.3 percent of an alkali metal carbonate, and from about 0.15 to 4.5 percent of a thickening agent with an aqueous solution of milk protein to provide a milk pudding dispersion having between about 0.4 and 5.4 percent of the dry ingredients, the percent based on the weight of the dispersion, cooling the milk pudding dispersion to between about 0°C. and 21°C. for at least 5 minutes to provide a cold gel milk pudding.

The gelling agent combination set forth herein may also contain a sweetening agent at a level sufficient to impart the desired degree of sweetness for the particular cold set milk pudding.

Preferably, the milk pudding dispersion is cooled to a temperature between about 4°C. and 13°C. However, the most preferred results are obtained when the milk pudding dispersion is cooled to a temperature of 4° to 5°C.

The present invention is more fully illustrated in the examples which follow:

EXAMPLE 1

The following is an instant cold set milk pudding formulation prepared in accordance with the present invention using a thickening agent, an alkaline earth metal orthophosphate, a tetraalkali metal pyrophosphate, and an alkali metal carbonate in the gelling agent combination:

| Sweetening Agent: | | |
|---|---|---|
| Sugar (Baker's Special) | grams | 73 |
| Flavoring Agent: | | |
| Salt | grams | 2.4 |
| Gelling Ageng Combination: | | |
| Pregelatinized Starch | grams | 18.5 |
| Monocalcium orthophosphate | grams | 0.8 |
| Tetrasodium pyrophosphate | grams | 2.5 |
| Sodium carbonate | grams | 0.7 |
| Milk Protein: | | |
| Whole fluid milk | ml | 473 |

The cold set milk pudding was prepared by first admixing the solid ingredients described above with the whole fluid milk at 10°C., stirring for 1 minute, allowing the mixture to stand for 5 minutes at room temperature, and refrigerating at 4° to 5°C. for 20 minutes. The initial viscosity was then measured by the method described as follows:

All viscosity determinations were performed using a Brookfield Viscosimeter, Model HAF with a helipath attachment and type TB spindle. Each determination was conducted at a spindle speed of 5 revolutions per minute and recorded on a scale of 0 to 500. Initial viscosities in the range of between about 180 to 220 were considered ideal in terms of pudding applications. Initial viscosities below 160 and above 230 were undesirable.

The pudding was then allowed to stand overnight in the refrigerator at 4° to 5°C. and the final viscosity determined in the morning, as previously described. Final viscosities in the range of between about 200 to about 220 were ideal in terms of milk pudding applications. Final viscosities below 180 and above 230 were found undesirable.

The initial and final viscosities of the cold set milk pudding were 218 and 210, respectively as set forth in Table I.

The degree of syneresis was also determined at this time by estimating the extent of gel separation or contraction with the resulting separation of water. The cold set milk pudding prepared according to Example 1 exhibited a trace of syneresis after setting as set forth in Table I.

EXAMPLE 2

The following is an instant cold set milk pudding formulation prepared in accordance with the present invention using a thickening agent, an alkaline earth metal orthophosphate, a dialkali metal pyrophosphate, and an alkali metal carbonate in the gelling agent combination:

| | | |
|---|---|---|
| Sweetening Agent: | | |
| Sugar (Baker's Special) | grams | 71.5 |
| Flavoring Agent: | | |
| Salt | grams | 2.4 |
| Gelling Agent Combination: | | |
| Pregelatinized Starch | grams | 20 |
| Monocalcium orthophosphate | grams | 0.6 |
| Disodium dihydrogen pyrophosphate | grams | 2.1 |
| Sodium carbonate | grams | 1.4 |
| Milk Protein: | | |
| Whole fluid milk | ml | 473 |

The process of preparing this instant cold set milk pudding is as described in Example 1. The initial and final viscosities of the instant cold set pudding were 185 and 210, respectively, as set forth in Table I. The pudding prepared according to Example 2 exhibited a trace of syneresis after setting as set forth in Table I. In addition, the pudding prepared according to Example 2 did not exhibit off-flavor development.

EXAMPLE 3

The following is an instant cold set milk pudding formulation prepared in accordance with the present invention using a thickening agent, an alkaline earth metal orthophosphate, a dialkali metal pyrophosphate, and an alkali metal carbonate in the gelling agent combination:

| | | |
|---|---|---|
| Sweetening Agent: | | |
| Sugar (Baker's Special) | grams | 73 |
| Flavoring Agent: | | |
| Salt | grams | 2.4 |
| Gelling Agent Combination: | | |
| Pregelatinized Starch | grams | 18.5 |
| Monocalcium orthophosphate | grams | 0.8 |
| Disodium dihydrogen pyrophosphate | grams | 2.0 |
| Sodium carbonate | grams | 1.6 |
| Milk Protein: | | |
| Whole fluid milk | ml | 473 |

The process of preparing this instant cold set milk pudding is as described in Example 1. The initial and final viscosities of the instant cold set pudding were 218 and 220, respectively as set forth in Table I. The pudding prepared according to Example 3 exhibited a trace of syneresis after setting as set forth in Table I.

EXAMPLE 4

The following is a control instant cold milk pudding formulation prepared without the use of sodium carbonate in the gelling agent combination:

| | | |
|---|---|---|
| Sweetening Agent: | | |
| Sugar (Baker's Special) | grams | 73 |
| Flavoring Agent: | | |
| Salt | grams | 2.4 |
| Gelling Agent Combination: | | |
| Pregelatinized Starch | grams | 18.5 |
| Monocalcium orthophosphate | grams | 0.8 |
| Tetrasodium pyrophosphate | grams | 2.5 |
| Milk Protein: | | |
| Whole fluid milk | ml | 473 |

The process of preparing this instant cold set milk pudding is as described in Example 1. The foregoing formulation gave an instant cold set milk pudding which exhibited an undesirably high level of syneresis as set forth in Table I. The initial and final viscosities of this instant cold set milk pudding were 182 and 160, respectively which indicate undesirable initial and final pudding viscosities as set forth in Table I.

EXAMPLE 5

The following is a control cold set milk pudding formulation prepared without the use of monocalcium orthophosphate in the gelling agent combination:

| | | |
|---|---|---|
| Sweetening Agent: | | |
| Sugar (Baker's Special) | grams | 71.5 |
| Flavoring Agent: | | |
| Salt | grams | 2.4 |
| Gelling Agent Combination: | | |
| Pregelatinized Starch | grams | 20 |
| Disodium dihydrogen pyrophosphate | grams | 2.1 |
| Sodium carbonate | grams | 1.4 |
| Milk Protein: | | |
| Whole fluid milk | ml | 473 |

The process of preparing this instant cold set milk pudding is as described in Example 1. The initial and final viscosities of this pudding were 90 and 95, respectively, which indicate undesirable initial and final pudding viscosities as set forth in Table I.

EXAMPLE 6

The following is a control cold set milk pudding formulation prepared without the use of disodium didydrogen pyrophosphate in the gelling agent combination:

| | | |
|---|---|---|
| Sweetening Agent: | | |
| Sugar (Baker's Special) | grams | 71.5 |
| Flavoring Agent: | | |
| Salt | grams | 2.4 |
| Gelling Agent Combination: | | |
| Pregelatinized starch | grams | 20 |
| Monocalcium orthophosphate | grams | 0.6 |
| Sodium carbonate | grams | 1.4 |
| Milk Protein: | | |
| Whole fluid milk | ml | 473 |

The process of preparing this cold set milk pudding is as described in Example 1. The initial and final viscosities of this pudding were 0 and 0 respectively, as set forth in Table I.

EXAMPLE 7

The following is a control cold set milk pudding formulation prepared without the use of pregelatinized starch in the gelling agent combination:

| | | |
|---|---|---|
| Sweetening Agent: | | |
| Sugar (Baker's Special) | grams | 71.5 |
| Flavoring Agent: | | |
| Salt | grams | 2.4 |
| Gelling Agent Combination: | | |
| Monocalcium orthophosphate | grams | 0.6 |
| Disodium dihydrogen pyrophosphate | grams | 2.1 |
| Sodium carbonate | grams | 1.4 |
| Milk Protein: | | |
| Whole fluid milk | ml | 473 |

The process of preparing this cold set milk pudding is as described in Example 1. The initial and final viscosities of this pudding were 92 and 85, respectively, which indicate undesirable initial and final pudding viscosities as set forth in Table I.

EXAMPLE 8

The following is a formulation for an instant cold set milk pudding prepared with increased levels of sweetening agent, i.e., sugar, and thickening agent, i.e., pregelatinized starch, and decreased levels of alkaline earth metal orthophosphate, i.e., monocalcium orthophosphate, dialkali metal pyrophosphate, i.e., disodium dihydrogen pyrophosphate, and alkali metal carbonate, i.e., sodium bicarbonate, as compared to Example 3.

| Sweetening Agent: | | |
|---|---|---|
| Sugar (Baker's Special) | grams | 81 |
| Flavoring Agent: | | |
| Salt | grams | 2.4 |
| Gelling Agent Combination: | | |
| Pregelatinized starch | grams | 20 |
| Monocalcium orthophosphate | grams | 0.6 |
| Disodium dihydrogen pyrophosphate | grams | 1.7 |
| Sodium bicarbonate | grams | 1.4 |
| Milk Protein: | | |
| Whole fluid milk | ml | 473 |

The process of preparing this instant cold set milk pudding is as described in Example 1. The initial and final viscosities of this instant cold set milk pudding were 160 and 245 respectively and are set forth in Table I. The pudding prepared according to the foregoing example exhibited a trace of syneresis after setting as set forth in Table I.

EXAMPLE 9

The following is a formulation for an instant cold set milk pudding prepared with a dialkali metal orthophosphate substituted for the alkaline earth metal orthophosphate:

| Sweetening Agent: | | |
|---|---|---|
| Sugar (Baker's Special) | grams | 81 |
| Flavoring Agent: | | |
| Salt | grams | 2.4 |
| Gelling Agent Combination: | | |
| pregelatinized starch | grams | 20 |
| Disodium orthophosphate | grams | 1 |
| Disodium dihydrogen pyrophosphate | grams | 1.5 |
| Sodium carbonate | grams | 0.7 |
| Milk Protein: | | |
| Whole fluid milk | ml | 473 |

The process of preparing this instant cold set milk pudding is as described in Example 1. The initial and final viscosities of the pudding were 150 and 160, respectively as set forth in Table I. The pudding prepared according to the foregoing example exhibited a trace of syneresis after setting as set forth in Table I.

TABLE I

COLD SET MILK PUDDING EVALUATION
EXAMPLE DESCRIPTION (Expressed in % by Weight of Final Pudding)

| Example Number | Sweetening Agent | Flavoring Agent | Gelling Agent Combination | | | Milk Protein | Viscosity | | Syneresis |
| | | | Starch | Ortho-phosphate | Pyro-phosphate | Carbonate | | Initial | Final | |
|---|---|---|---|---|---|---|---|---|---|---|
| 1 | 12.43 | 0.41 | 3.75 | 0.14[3] | 0.43[1] | 0.12[5] | 83.46 | 218 | 210 | Trace |
| 2 | 12.18 | 0.41 | 3.41 | 0.10[3] | 0.36[2] | 0.24[5] | 83.30 | 185 | 210 | Trace |
| 3 | 12.43 | 0.41 | 3.15 | 0.14[3] | 0.34[2] | 0.27[5] | 83.26 | 218 | 220 | Trace |
| 4 (control) | 12.42 | 0.41 | 3.14 | 0.14[3] | 0.43[1] | — | 83.46 | 182 | 160 | High (undesirable) |
| 5 (control) | 12.20 | 0.41 | 3.41 | — | 0.36[2] | 0.24[5] | 83.38 | 90 | 95 | — |
| 6 (control) | 12.21 | 0.41 | 3.42 | 0.10[3] | — | 0.24[5] | 83.62 | 0 | 0 | — |
| 7 (control) | 12.61 | 0.42 | — | 0.11[3] | 0.37[2] | 0.25[5] | 86.24 | 42 | 85 | — |
| 8 | 13.58 | 0.40 | 3.35 | 0.10[3] | 0.29[2] | 0.25[6] | 82.03 | 160 | 245 | Trace |
| 9 | 13.51 | 0.40 | 3.36 | 0.17[4] | 0.25[2] | 0.12[5] | 82.09 | 150 | 160 | Trace |

[1] Tetrasodium pyrophosphate
[2] Sodium dihydrogen pyrophosphate
[3] Monocalcium orthophosphate
[4] Disodium orthophosphate
[5] Sodium carbonate
[6] Sodium bicarbonate Viscosity Evaluation:
Initial:
 180 – 220: desirable
 <160 and >230: undesirable
Final:
 200 – 220: desirable
 <180 and >230: undesirable It is noted from Table I that in terms of gel viscosity and syneresis no significant difference exists between the instant cold set milk puddings prepared with tetraalkali metal pyrophosphate and dialkali metal pyrophosphate as shown in Examples 1 and 3, respectively. Therefore, the tetraalkali metal and/or the dialkali metal pyrophosphate may be used in the composition of the present invention with equal effectiveness.

It is apparent from Example 4 of Table I that the addition of an alkali metal carbonate, as for example sodium carbonate, to the combination of ingredients included within the composition of the present invention is essential in terms of pudding stability and viscosity in order to form a cold set pudding with milk protein.

Comparing Examples 2 and 5, it is apparent from Table I that the addition of an alkaline earth metal orthophosphate, as for example, monocalcium orthophosphate, to the combination of ingredients included within the composition of the present invention is essential in terms of pudding viscosity in order to form a cold set pudding with milk protein.

Comparing Examples 2 and 6, it is apparent from Table I that the addition of an alkali metal pyrophosphate, as for example, disodium dihydrogen pyrophosphate, to the combination of ingredients of the present invention is essential in terms of pudding viscosity in order to form a cold set pudding with milk protein.

Comparing Examples 2 and 7, it is apparent from Table I that the addition of thickening agent, as for example, pregelatinized starch, to the combination of ingredients of the present invention is essential in terms of pudding viscosity in order to form a cold set pudding with milk protein.

Comparing Examples 8 and 3 of Table I, it is apparent that no significant difference is obtained in terms of pudding stability and viscosity by increasing sugar and starch in the base formulation and decreasing levels of alkali metal pyrophosphate, alkaline earth metal orthophosphate, and alkali metal carbonate.

It is also apparent from Examples 8 and 9 of Table I that the initial and final viscosities of an instant cold set milk pudding prepared with a dialkali metal orthophosphate (Example 9) instead of an alkaline earth metal orthophosphate (Example 8) results in significantly lower initial and final viscosities.

What is claimed is:

1. A gelling agent combination for use in preparing a cold set milk pudding with a milk protein which comprises in combination:
   a. an aqueous soluble alkali metal pyrophosphate;
   b. an aqueous soluble alkaline earth metal orthophosphate;
   c. an aqueous soluble alkali metal carbonate, wherein said alkali metal in said carbonate is sodium or potassium; and
   d. a thickening agent selected from the group consisting of pregelatinized starch, gums, or mixtures thereof.

2. The gelling agent combination of claim 1 wherein said alkali metal pyrophosphate is a tetraalkali metal pyrophosphate selected from the group consisting of tetrasodium pyrophosphate, tetrapotassium pyrophosphate, and mixtures thereof.

3. The gelling combination of claim 1 wherein said alkali metal pyrophosphate is a dialkali metal pyrophosphate selected from the group consisting of disodium dihydrogen pyrophosphate, dipotassium dihydrogen pyrophosphate, or mixtures thereof.

4. The gelling agent combination of claim 1 wherein said alkaline earth metal orthophosphate is calcium dihydrogen orthophosphate.

5. The gelling agent combination of claim 1 wherein said alkali metal carbonate is sodium carbonate.

6. The gelling agent combination of claim 1 wherein said thickening agent is pregelatinized starch.

7. The gelling agent combination of claim 1 wherein said alkali metal pyrophosphate is tetrasodium pyrophosphate, said alkaline earth metal orthophosphate is calcium dihydrogen orthophosphate, said alkali metal carbonate is sodium carbonate, and said thickening agent is pregelatinized starch.

8. The gelling agent combination of claim 1 wherein said alkali metal pyrophosphate is disodium dihydrogen pyrophosphate, said alkaline earth metal orthophosphate is calcium dihydrogen orthophosphate, said alkali metal carbonate is sodium carbonate, and said thickening agent is pregelatinized starch.

9. A cold set milk pudding composition comprising the gelling agent combination of claim 1 which further includes milk protein, and water.

10. A gelling agent combination for use in preparing a cold set milk pudding which comprises:
    a. from about 0.25 to 0.6 percent of an aqueous soluble alkali metal pyrophosphate;
    b. from about 0.03 to 0.2 percent of an aqueous soluble alkaline earth metal orthophosphate;
    c. from about 0.0015 to 0.30 percent of an aqueous soluble alkali metal carbonate; and
    d. from about 0.15 to 4.5 percent of a thickening agent selected from the group consisting of pregelatinized starch, gums, or mixtures thereof; said percentages being by weight based on the total weight of said cold set milk pudding.

11. The gelling agent combination of claim 10 wherein said alkali metal pyrophosphate is a tetraalkali metal pyrophosphate selected from the group consisting of tetrasodium pyrophosphate, tetrapotassium pyrophosphate, and mixtures thereof.

12. The gelling agent combination of claim 10 wherein said alkali metal pyrophosphate is a dialkali metal pyrophosphate selected from the group consisting of disodium dihydrogen pyrophosphate, dipotassium dihydrogen pyrophosphate, and mixtures thereof.

13. The gelling agent combination of claim 10 wherein said alkaline earth metal orthophosphate is calcium dihydrogen orthophosphate.

14. The gelling agent combination of claim 10 wherein said aqueous soluble alkali metal carbonate is sodium carbonate.

15. The gelling agent combination of claim 10 wherein said thickening agent is pregelatinized starch.

16. The gelling agent combination of claim 10 wherein said alkali metal pyrophosphate is tetrasodium pyrophosphate, said alkaline earth metal orthophosphate is calcium dihydrogen orthophosphate, said alkali metal carbonate is sodium carbonate, and said thickening agent is pregelatinized starch.

17. The gelling agent combination of claim 10 wherein said alkali metal pyrophosphate is disodium dihydrogen pyrophosphate, said alkaline earth metal orthophosphate is calcium dihydrogen orthophosphate, said alkali metal carbonate is sodium carbonate, and said thickening agent is pregelatinized starch.

18. A cold set milk pudding composition comprising the gelling agent combination of claim 10 which further includes milk protein, and water.

19. A gelling agent combination for use in preparing a cold set milk pudding which comprises:
    a. from about 0.25 to 0.6 percent of an alkali metal pyrophosphate selected from the group consisting of tetrasodium pyrophosphate, tetrapotassium pyrophosphate, disodium dihydrogen pyrophosphate, dipotassium dihydrogen pyrophosphate, and mixtures thereof;
    b. from about 0.09 to 0.14 percent of an alkaline earth metal orthophosphate
    c. from about 0.1 to 0.3 percent of an alkali metal carbonate; and
    d. from about 3.1 to 3.8 percent of a thickening agent selected from the group consisting of pregelatinized starch, gums, or mixtures thereof; said percentages being by weight based on the total weight of said cold set milk pudding.

20. The gelling agent combination of claim 19 wherein said alkali metal pyrophosphate is from about 0.3 to 0.5 percent tetrasodium pyrophosphate, said alkaline earth metal orthophosphate is from about 0.10 to 0.14 percent calcium dihydrogen orthophosphate, said alkali metal carbonate is from about 0.10 to 0.15 percent sodium carbonate, and said thickening agent is from about 3.6 to 3.8 percent pregelatinized starch.

21. The gelling agent combination of claim 19 wherein said alkali metal pyrophosphate is from about 0.25 to 0.35 percent disodium dihydrogen pyrophosphate, said alkaline earth metal orthophosphate is from about 0.10 to 0.14 percent calcium dihydrogen phosphate, said alkali metal carbonate is from about 0.2 to 0.3 percent sodium carbonate, and said thickening agent is from about 3.1 to 3.4 percent pregelatinized starch.

22. A cold set milk pudding composition comprising the gelling agent combination of claim 19 which further includes milk protein, and water.

* * * * *